(12) United States Patent
Davis et al.

(10) Patent No.: US 8,000,518 B2
(45) Date of Patent: *Aug. 16, 2011

(54) METHODS, OBJECTS AND APPARATUS EMPLOYING MACHINE READABLE DATA

(75) Inventors: Bruce L. Davis, Lake Oswego, OR (US); Geoffrey B. Rhoads, West Linn, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/485,666

(22) Filed: Jun. 16, 2009

(65) Prior Publication Data

US 2009/0252401 A1    Oct. 8, 2009

Related U.S. Application Data

(60) Continuation of application No. 11/925,602, filed on Oct. 26, 2007, now Pat. No. 7,548,643, which is a division of application No. 11/621,839, filed on Jan. 10, 2007, now Pat. No. 7,313,253, which is a continuation of application No. 11/456,809, filed on Jul. 11, 2006, now Pat. No. 7,305,117, which is a continuation of application No. 11/106,186, filed on Apr. 13, 2005, now Pat. No. 7,076,084, which is a continuation of application No. 10/693,269, filed on Oct. 23, 2003, now Pat. No. 6,882,738, which is a continuation of application No. 09/151,492, filed on Sep. 11, 1998, now abandoned.

(51) Int. Cl.
*G06K 9/00* (2006.01)
*H04K 1/00* (2006.01)

(52) U.S. Cl. .............................. 382/141; 340/5.8; 438/16
(58) Field of Classification Search .................. 382/100, 382/141, 143, 145, 152; 340/500, 540, 635, 340/653, 5.8; 438/14, 15, 16, 17; 235/468
See application file for complete search history.

(56) References Cited

U.S. PATENT DOCUMENTS

| 4,510,673 A | * | 4/1985 | Shils et al. ..................... 29/574 |
| 4,585,931 A | | 4/1986 | Duncan et al. ................ 235/464 |
| 4,638,144 A | | 1/1987 | Latta, Jr. ................. 219/121 LH |

(Continued)

FOREIGN PATENT DOCUMENTS

WO    WO 00/65541 A1    11/2000

OTHER PUBLICATIONS

Oct. 31, 2007 Notice of Allowance including Examiner Interview Summary; Oct. 11, 2007 Amendment entered with RCE; and Sep. 4, 2007 Notice of Allowance and Examiner Interview Summary; all from assignee's U.S. Appl. No. 11/621,839 (now US Patent No. 7,313,253).

(Continued)

*Primary Examiner* — Andrew W Johns

(57) ABSTRACT

The present invention relates generally to steganography and data hiding. One claim recites an object including: electronic processing circuitry having an operating or performance metric associated therewith; and steganographic indicia carried by the object, the steganographic indicia is usable as an index to verify the operating or performance metric. Another claim recites an apparatus including: electronic memory; and machine-readable indicia usable as a registry index including data that provides an indication regarding an expected capacity of the electronic memory. Other combinations are described and claimed as well.

6 Claims, 2 Drawing Sheets

U.S. PATENT DOCUMENTS

| | | | |
|---|---|---|---|
| 4,677,435 A | 6/1987 | D'Agraives et al. | 340/825.31 |
| 4,707,722 A | 11/1987 | Folk et al. | 357/67 |
| 4,825,093 A | 4/1989 | Kiriseko et al. | 250/566 |
| 4,945,204 A | 7/1990 | Nakamura et al. | 219/121.69 |
| 5,164,574 A | 11/1992 | Ujiie et al. | 235/462 |
| 5,175,774 A * | 12/1992 | Truax et al. | 382/8 |
| 5,256,578 A | 10/1993 | Corley et al. | 437/8 |
| 5,329,090 A | 7/1994 | Woelki et al. | 219/121.68 |
| 5,357,077 A | 10/1994 | Tsuruta | 219/121.68 |
| 5,413,629 A | 5/1995 | Yasui et al. | 106/21 R |
| 5,539,976 A | 7/1996 | Miyauchi et al. | 29/740 |
| 5,591,553 A | 1/1997 | Snelling | 430/46 |
| 5,636,292 A | 6/1997 | Rhoads | 382/232 |
| 5,644,102 A | 7/1997 | Rostoker | 174/52.1 |
| 5,686,759 A * | 11/1997 | Hyde et al. | 257/730 |
| 5,710,834 A | 1/1998 | Rhoads | 382/232 |
| 5,721,788 A | 2/1998 | Powell et al. | 382/100 |
| 5,734,274 A | 3/1998 | Gavish | 327/48 |
| 5,745,604 A | 4/1998 | Rhoads | 382/232 |
| 5,748,763 A | 5/1998 | Rhoads | 382/115 |
| 5,748,783 A | 5/1998 | Rhoads | 382/232 |
| 5,768,426 A | 6/1998 | Rhoads | 382/232 |
| 5,801,067 A * | 9/1998 | Shaw et al. | 438/15 |
| 5,809,160 A | 9/1998 | Powell et al. | 382/100 |
| 5,822,436 A | 10/1998 | Rhoads | 380/54 |
| 5,832,119 A | 11/1998 | Rhoads | 382/232 |
| 5,838,793 A | 11/1998 | Lewis | 380/25 |
| 5,841,886 A | 11/1998 | Rhoads | 382/115 |
| 5,841,978 A | 11/1998 | Rhoads | 395/200.47 |
| 5,850,481 A | 12/1998 | Rhoads | 382/232 |
| 5,862,260 A | 1/1999 | Rhoads | 382/232 |
| 5,890,807 A * | 4/1999 | Igel et al. | 382/100 |
| 5,986,781 A | 11/1999 | Long | 359/30 |
| 6,026,193 A | 2/2000 | Rhoads | 382/232 |
| 6,122,392 A | 9/2000 | Rhoads | 382/100 |
| 6,122,403 A | 9/2000 | Rhoads | 382/233 |
| 6,201,879 B1 | 3/2001 | Bender | 382/100 |
| 6,266,430 B1 | 7/2001 | Rhoads | 382/100 |
| 6,285,776 B1 | 9/2001 | Rhoads | 382/100 |
| 6,289,108 B1 | 9/2001 | Rhoads | 382/100 |
| 6,321,648 B1 | 11/2001 | Berson | 101/32 |
| 6,330,335 B1 | 12/2001 | Rhoads | 380/252 |
| 6,343,138 B1 | 1/2002 | Rhoads | 382/100 |
| 6,353,672 B1 | 3/2002 | Rhoads | 382/100 |
| 6,363,159 B1 | 3/2002 | Rhoads | 382/100 |
| 6,389,151 B1 | 5/2002 | Carr et al. | 382/100 |
| 6,400,827 B1 | 6/2002 | Rhoads | 382/100 |
| 6,404,898 B1 | 6/2002 | Rhoads | 382/100 |
| 6,430,302 B2 | 8/2002 | Rhoads | 382/100 |
| 6,449,377 B1 | 9/2002 | Rhoads | 382/100 |
| 6,449,379 B1 | 9/2002 | Rhoads | 382/100 |
| 6,496,591 B1 | 12/2002 | Rhoads | 382/100 |
| 6,519,352 B2 | 2/2003 | Rhoads | 382/100 |
| 6,522,771 B2 | 2/2003 | Rhoads | 382/100 |
| 6,535,618 B1 | 3/2003 | Rhoads | 382/100 |
| 6,539,095 B1 | 3/2003 | Rhoads | 381/73.1 |
| 6,542,618 B1 | 4/2003 | Rhoads | 382/100 |
| 6,542,620 B1 | 4/2003 | Rhoads | 382/100 |
| 6,546,112 B1 | 4/2003 | Rhoads | 382/100 |
| 6,560,349 B1 | 5/2003 | Rhoads | 382/100 |
| 6,567,534 B1 | 5/2003 | Rhoads | 382/100 |
| 6,567,535 B2 | 5/2003 | Rhoads | 382/100 |
| 6,567,780 B2 | 5/2003 | Rhoads | 704/273 |
| 6,574,350 B1 | 6/2003 | Rhoads et al. | 382/100 |
| 6,580,819 B1 | 6/2003 | Rhoads | 382/135 |
| 6,587,821 B1 | 7/2003 | Rhoads | 704/270 |
| 6,590,997 B2 | 7/2003 | Rhoads | 382/100 |
| 6,647,129 B2 | 11/2003 | Rhoads | 382/100 |
| 6,654,480 B2 | 11/2003 | Rhoads | 382/100 |
| 6,654,887 B2 | 11/2003 | Rhoads | 713/176 |
| 6,675,146 B2 | 1/2004 | Rhoads | 704/270 |
| 6,718,047 B2 | 4/2004 | Rhoads | 382/100 |
| 6,724,912 B1 | 4/2004 | Carr et al. | 382/100 |
| 6,731,221 B1 | 5/2004 | Dioshongh et al. | 340/691.6 |
| 6,738,495 B2 | 5/2004 | Rhoads et al. | 382/100 |
| 6,744,907 B2 | 6/2004 | Rhoads | 382/100 |
| 6,750,985 B2 | 6/2004 | Rhoads | 358/3.28 |
| 6,754,377 B2 | 6/2004 | Rhoads | 382/135 |
| 6,757,406 B2 | 6/2004 | Rhoads | 382/100 |
| 6,768,808 B2 | 7/2004 | Rhoads | 382/100 |
| 6,771,796 B2 | 8/2004 | Rhoads | 382/100 |
| 6,778,682 B2 | 8/2004 | Rhoads | 382/100 |
| 6,804,379 B2 | 10/2004 | Rhoads | 382/101 |
| 6,882,738 B2 | 4/2005 | Davis et al. | 382/104 |
| 6,944,298 B1 | 9/2005 | Rhoads | 380/205 |
| 6,959,100 B2 | 10/2005 | Rhoads | 382/100 |
| 6,959,386 B2 | 10/2005 | Rhoads | 713/176 |
| 6,970,573 B2 | 11/2005 | Carr et al. | 382/100 |
| 6,978,036 B2 | 12/2005 | Alattar et al. | 382/100 |
| 6,983,051 B1 | 1/2006 | Rhoads | 380/252 |
| 6,987,862 B2 | 1/2006 | Rhoads | 382/100 |
| 6,993,152 B2 | 1/2006 | Patterson et al. | 382/100 |
| 7,003,132 B2 | 2/2006 | Rhoads | 382/100 |
| 7,054,462 B2 | 5/2006 | Rhoads et al. | 382/100 |
| 7,054,463 B2 | 5/2006 | Rhoads et al. | 382/100 |
| 7,076,084 B2 | 7/2006 | Davis et al. | 382/100 |
| 7,113,615 B2 | 9/2006 | Rhoads et al. | 382/100 |
| 7,130,087 B2 | 10/2006 | Rhoads | 358/3.28 |
| 7,181,022 B2 | 2/2007 | Rhoads | 381/73.1 |
| 7,184,570 B2 | 2/2007 | Rhoads | 382/100 |
| 7,239,734 B2 | 7/2007 | Alattar et al. | 382/135 |
| 7,242,790 B2 | 7/2007 | Rhoads | 382/100 |
| 7,263,203 B2 | 8/2007 | Rhoads et al. | 382/100 |
| 7,266,217 B2 | 9/2007 | Rhoads et al. | 382/100 |
| 7,269,275 B2 | 9/2007 | Carr et al. | 382/100 |
| 7,286,684 B2 | 10/2007 | Rhoads et al. | 382/100 |
| 7,305,117 B2 * | 12/2007 | Davis et al. | 382/141 |
| 7,313,253 B2 | 12/2007 | Davis et al. | 382/100 |
| 7,321,667 B2 | 1/2008 | Stach | 382/100 |
| 7,340,076 B2 | 3/2008 | Stach et al. | 382/100 |
| 7,359,528 B2 | 4/2008 | Rhoads | 382/100 |
| 7,372,976 B2 | 5/2008 | Rhoads et al. | 382/100 |
| 7,415,129 B2 | 8/2008 | Rhoads | 382/100 |
| 7,418,111 B2 | 8/2008 | Rhoads | 382/100 |
| 7,424,132 B2 | 9/2008 | Rhoads | 382/100 |
| 7,499,564 B2 | 3/2009 | Rhoads | 382/100 |
| 7,532,741 B2 | 5/2009 | Stach | 382/100 |
| 7,536,555 B2 | 5/2009 | Rhoads | 713/176 |
| 7,539,325 B2 | 5/2009 | Rhoads et al. | 382/100 |
| 7,548,643 B2 * | 6/2009 | Davis et al. | 382/141 |
| 7,555,139 B2 | 6/2009 | Rhoads et al. | 382/100 |
| 7,567,686 B2 | 7/2009 | Rhoads | 382/100 |
| 7,570,784 B2 | 8/2009 | Alattar | 382/100 |
| 7,602,940 B2 | 10/2009 | Rhoads et al. | 382/100 |
| 7,602,977 B2 | 10/2009 | Rhoads et al. | 382/232 |
| 7,606,390 B2 | 10/2009 | Rhoads | 382/100 |
| 7,639,837 B2 | 12/2009 | Carr et al. | 382/100 |
| 7,672,477 B2 | 3/2010 | Rhoads | 382/100 |
| 7,676,059 B2 | 3/2010 | Rhoads | 382/100 |
| 7,702,511 B2 | 4/2010 | Rhoads | 704/270 |
| 7,720,249 B2 | 5/2010 | Rhoads | 382/100 |
| 7,720,255 B2 | 5/2010 | Rhoads | 382/100 |
| 7,724,919 B2 | 5/2010 | Rhoads | 382/100 |
| 7,796,826 B2 | 9/2010 | Rhoads et al. | 382/233 |
| 7,831,062 B2 | 11/2010 | Stach | 382/100 |
| 2001/0022848 A1 | 9/2001 | Rhoads | 382/100 |
| 2002/0080995 A1 | 6/2002 | Rhoads | 382/100 |
| 2002/0136429 A1 | 9/2002 | Stach et al. | 382/100 |
| 2003/0021440 A1 | 1/2003 | Rhoads | 382/100 |
| 2003/0138128 A1 | 7/2003 | Rhoads | 382/100 |
| 2003/0145747 A1 | 8/2003 | Mayer et al. | 101/395 |
| 2004/0057581 A1 | 3/2004 | Rhoads | 380/59 |
| 2004/0181671 A1 | 9/2004 | Brundage et al. | 713/176 |
| 2004/0263911 A1 | 12/2004 | Rodriguez et al. | 358/3.28 |
| 2005/0111047 A1 | 5/2005 | Rhoads | 358/3.28 |
| 2006/0028689 A1 | 2/2006 | Perry et al. | 358/3.28 |
| 2006/0062386 A1 | 3/2006 | Rhoads | 380/236 |
| 2007/0016790 A1 | 1/2007 | Brundage et al. | 713/176 |
| 2007/0172098 A1 | 7/2007 | Rhoads et al. | 382/100 |
| 2007/0201835 A1 | 8/2007 | Rhoads | 386/96 |
| 2008/0131083 A1 | 6/2008 | Rhoads | 386/96 |
| 2008/0131084 A1 | 6/2008 | Rhoads | 386/96 |
| 2008/0149713 A1 | 6/2008 | Brundage | 235/435 |

| | | | |
|---|---|---|---|
| 2008/0253740 A1 | 10/2008 | Rhoads | 386/95 |
| 2008/0275906 A1 | 11/2008 | Rhoads et al. | 707/102 |
| 2009/0252401 A1 | 10/2009 | Davis et al. | 382/141 |
| 2010/0008534 A1 | 1/2010 | Rhoads | 382/100 |
| 2010/0008536 A1 | 1/2010 | Rhoads | 382/100 |
| 2010/0008537 A1 | 1/2010 | Rhoads | 382/100 |
| 2010/0021004 A1 | 1/2010 | Rhoads | 382/100 |
| 2010/0027969 A1 | 2/2010 | Alattar | 386/94 |
| 2010/0040255 A1 | 2/2010 | Rhoads | 382/100 |
| 2010/0119108 A1 | 5/2010 | Rhoads | 382/100 |
| 2010/0131767 A1 | 5/2010 | Rhoads | 713/176 |
| 2010/0142752 A1 | 6/2010 | Rhoads et al. | 382/100 |
| 2010/0146285 A1 | 6/2010 | Rhoads et al. | 713/717 |
| 2010/0163629 A1 | 7/2010 | Rhoads et al. | 235/487 |
| 2010/0172538 A1 | 7/2010 | Rhoads | 382/100 |

OTHER PUBLICATIONS

Feb. 9, 2009 Notice of Allowance; Jan. 5, 2009 Amendment; Dec. 30, 2009 non-final Office Action; Nov. 4, 2008 Amendment; Jul. 7, 2008 non-final Office Action; all from U.S. Appl. No. 11/925,602.

U.S. Appl. No. 08/154,866, filed Nov. 18, 1993, Geoffrey B. Rhoads.

U.S. Appl. No. 08/215,289, filed Mar. 17, 1994, Geoffrey B. Rhoads.

U.S. Appl. No. 09/150,147, filed Sep. 9, 1998, Geoffrey B. Rhoads.

U.S. Appl. No. 09/151,492, filed Sep. 11, 1998, Bruce L. Davis et al.

U.S. Appl. No. 09/496,380, filed Feb. 2, 2000, Geoffrey B. Rhoads.

U.S. Appl. No. 12/881,911, filed Sep. 14, 2010, Geoffrey B. Rhoads et al.

* cited by examiner

Binary data payload    0    1    1    0    FIG. 2A

Payload as +1/-1    -1    1    1    -1    FIG. 2B

|    |    |    |    |    |    |    |
|----|----|----|----|----|----|----|
| 1  | 1  | -1 | 1  | 1  | -1 | 1  |
| -1 | 1  | 1  | -1 | 1  | 1  | -1 |
| 1  | -1 | -1 | 1  | 1  | -1 | -1 |
| 1  | 1  | -1 | 1  | -1 | -1 | 1  |
| -1 | -1 | -1 | -1 | 1  | 1  | 1  |
|    | -1 | 1  | 1  | -1 | 1  | 1  |
| -1 |    |    |    |    |    |    |
| -1 | 1  | -1 | -1 | -1 | 1  | -1 |

FIG. 2C

|    |    |    |    |    |    |    |
|----|----|----|----|----|----|----|
| -1 | 1  | -1 | -1 | -1 | -1 | 1  |
| 1  | 1  | 1  | 1  | -1 | 1  | -1 |
| -1 | 1  | -1 | 1  | -1 | 1  | -1 |
| 1  | -1 | 1  | 1  | -1 | 1  | -1 |
| -1 | -1 | 1  | 1  | 1  | 1  | -1 |
| 1  | 1  | 1  | 1  | 1  | 1  | -1 |
| 1  | -1 | -1 | -1 | 1  | -1 | -1 |

FIG. 2D

METHODS, OBJECTS AND APPARATUS EMPLOYING MACHINE READABLE DATA

RELATED APPLICATION DATA

This application is a continuation of U.S. patent application Ser. No. 11/925,602, filed Oct. 26, 2007 (U.S. Pat. No. 7,548,643), which is a division of U.S. patent application Ser. No. 11/621,839, filed Jan. 10, 2007 (U.S. Pat. No. 7,313,253), which is a continuation of application Ser. No. 11/456,809, filed Jul. 11, 2006 (U.S. Pat. No. 7,305,117), which is a continuation of application Ser. No. 11/106,186, filed Apr. 13, 2005 (U.S. Pat. No. 7,076,084), which is a continuation of application Ser. No. 10/693,269, filed Oct. 23, 2003 (U.S. Pat. No. 6,882,738), which is a continuation of application Ser. No. 09/151,492, filed Sep. 11, 1998 (now abandoned).

This application is also related to application Ser. No. 08/438,159, filed May 8, 1995 (now U.S. Pat. No. 5,850,481), which is a continuation-in-part of application Ser. No. 08/327,426, filed Oct. 21, 1994 (now U.S. Pat. No. 5,768,426), which is a continuation-in-part of abandoned application Ser. No. 08/215,289, filed Mar. 17, 1994.

The subject matter of this application is also related to that of the present assignee's other issued patents (U.S. Pat. Nos. 5,636,292, 5,710,834, 5,721,788, 5,745,604, 5,748,763, 5,748,783, 5,768,426, and 5,809,160, 5,841,978, 5,832,119, 5,822,436, 5,841,886, 5,862,260, 6,026,193, 6,122,392, 6,122,403, and 6,449,377).

FIELD OF THE INVENTION

The invention relates to methods and systems for inconspicuously marking utilitarian objects (e.g. microprocessors, compact disks, pharmaceutical tablets, bolts and hardware, wristwatches, automotive components, etc.) with digital data.

BACKGROUND AND SUMMARY OF THE INVENTION

Sometimes things are not what they seem. An Intel integrated circuit, sold by a local computer shop as a 400 MHz Pentium II, may have been a 333 MHz Pentium II when it left the Intel factory. A defense contractor who ordered a specially-tested $50 bolt for use in a demanding aerospace application may be supplied with an inferior 50 cent bolt instead. Many enterprises suffer by such fraudulent product substitution.

Considering more particularly the integrated circuit case, IC manufacturers rigorously test their chips to assure that published specifications are met under all expected operating conditions. A chip that meets specs when operated at 400 MHz commands a substantial price premium over a chip that meets specs only at 333 MHz.

Commonly, chips with lower speed ratings are produced on the same fabrication lines as chips with top speed ratings but, during post-fab testing, fail to meet the more demanding spec under some extreme of operating conditions (e.g. at stressful ambient conditions, marginal power supply potentials, etc.). Unscrupulous distributors, aware that such chips may meet the higher specs under most conditions, sometimes "push" the speed ratings and re-mark, e.g., a 333 MHz chip as the much more costly 400 MHz chip.

Accounts of such duplicity are common. The Jun. 5, 1998, Orange County Register reported on purchasers who were duped into buying 233 MHz Pentium II processors for $620 each (instead of their then-prevailing $198 price), thinking they were 300 or 350 MHz models. Three days later, an account of such deception appeared in Computer Dealer news, this time involving incidents in Germany. Soon thereafter, Hong Kong Customs officials seized HK $2.9 million of similarly re-labeled Pentium II processors. (South China Morning Post, Aug. 18, 1998.)

Large computer companies, wary of unscrupulous chip distributors, commonly perform their own quality assurance testing of incoming chips. This testing is complex, costly, and time-consuming, but is viewed as necessary in order to assure the quality of the computer company's products.

One solution to this problem is for the manufacturer to encode—at the conclusion of testing—the chip's speed in a write-once memory (e.g. fusible links) formed in the integrated circuitry. This data can then be read-out by a subsequent purchaser of the chip to determine the original manufacturer's intended speed rating. Such an arrangement is detailed in Intel's U.S. Pat. No. 5,734,274.

While this electrical-encoding approach obviates the need for the purchaser to perform its own lengthy quality assurance testing, other drawbacks persist. For example, the purchaser must still remove the chip connector from its static-protective packaging and mate it with the socket of a reader device in order to discern the encoded speed data. So doing exposes the chip to potential static damage, thus requiring that this procedure be performed in a highly controlled environment by skilled personnel. Moreover, this approach increases the semiconductor die size, and impacts the yield.

A related approach is to form several (e.g. eight) metal traces on or near the exterior of the integrated circuit package, and laser-cut selected traces to represent one of, e.g., 256 different product grades/configurations. Such an arrangement is detailed in Intel's U.S. Pat. No. 5,686,759.

While an improvement in some respects over the fusible link approach, this latter technique has drawbacks of its own. For example, the provision of the metal traces on or near the exterior of the package limits packaging options, and makes assembly of the package more complex. Moreover, fairly sophisticated inspection equipment must be used to discern these product markings.

Finally, both of the foregoing approaches are suitable only with integrated circuits and the like, and have no counterpart, e.g., for bolts, etc.

To mark articles other than circuitry, a variety of techniques can be used. Most commonly, alphanumeric symbols are printed or otherwise formed on articles, permitting identification by inspection. However, such markings can readily be altered (as demonstrated by the remarking of integrated circuits, discussed above).

If a product marking is to be made resistant to tampering, a first step is to hide its significance from potential tamperers. One way of doing this is to employ computer-readable indicia (such as bar-codes), instead of alphanumeric symbols.

While bar codes are less likely to invite tampering than alphanumeric symbols, they still stand out as product markings. Still better would be product markings that, altogether, escape recognition as such.

Various such techniques are known. For example, numerous patents teach the marking of paper currency, lottery tickets and the like, with magnetic particles, phosphorescent dyes, etc. Such marking permits the authenticity of the articles to be verified. But the "bandwidth" of such inconspicuous techniques is quite limited, commonly being restricted to a single valid/invalid determination. Moreover, most such techniques are ill-suited for after-the-fact application to an article. Instead, such markings must generally be implemented as part of the article's original formation In accordance with a preferred embodiment of the invention, the foregoing and other drawbacks of the prior art are overcome. In an illustrative embodiment, the ceramic or plastic housing of an integrated circuit is provided with a textured surface in which digital data is encoded. The texturing does not alert the public to the conveyance of data, yet tens- or hundreds- of bits of data can be conveyed. The textured surface can be "read" using a hand-held scanner, without exposing the integrated circuit to possible static damage. Chip speed, together with other encoded data (e.g. date of fabrication, place of fabrication, size of cache, etc.) can thereby be discerned. Inspection of chips can be performed quickly by less-skilled personnel, and without special environmental controls.

In some embodiments, the texturing is effected through tooling used to produce, or modify, the packaging. In others, the texturing is effected by a patterned layer of additional material applied to a smooth surface. In still other embodiments, the surface is not textured but instead is printed with a seemingly random pattern in which the digital information is encoded. These techniques can be applied to any utilitarian object. Pharmaceuticals, compact disks, bolts and special hardware, automotive parts, and wristwatches, are just a few other examples.

One combination according to the invention is a method of determining an operating or performance characteristic associated with an apparatus. The method includes determining a numeric expression associated with the operating or performance characteristic, and steganographically hiding the numeric expression on or in the apparatus. The numeric expression is useable in determining whether the apparatus is operating or functioning as expected.

Another combination is an object including electronic processing circuitry having an operating or performance characteristic associated therewith; and steganographic indicia carried by the object. The steganographic indicia comprising or pointing to data to verify or test the operating or performance characteristic.

Yet another combination is an apparatus including circuitry including measurable performance or operating characteristics, and steganographic indicia including or linking to plural-bit data pertaining to the performance or operating characteristics.

The foregoing and other features, combinations and advantages of the invention will be more readily apparent from the following detailed description, which proceeds with reference to the accompanying drawings.

BRIEF DESCRIPTION OF THE DRAWINGS

FIG. 2A shows binary data used in a spread spectrum technique according to one embodiment.

FIG. 2B shows binary data used in a spread spectrum technique according to another embodiment.

FIG. 2C shows binary data used in a spread spectrum technique according to yet another embodiment.

FIG. 2D shows binary data used in a spread spectrum technique according to another embodiment.

DETAILED DESCRIPTION OF ILLUSTRATIVE EMBODIMENTS

Figure 1:
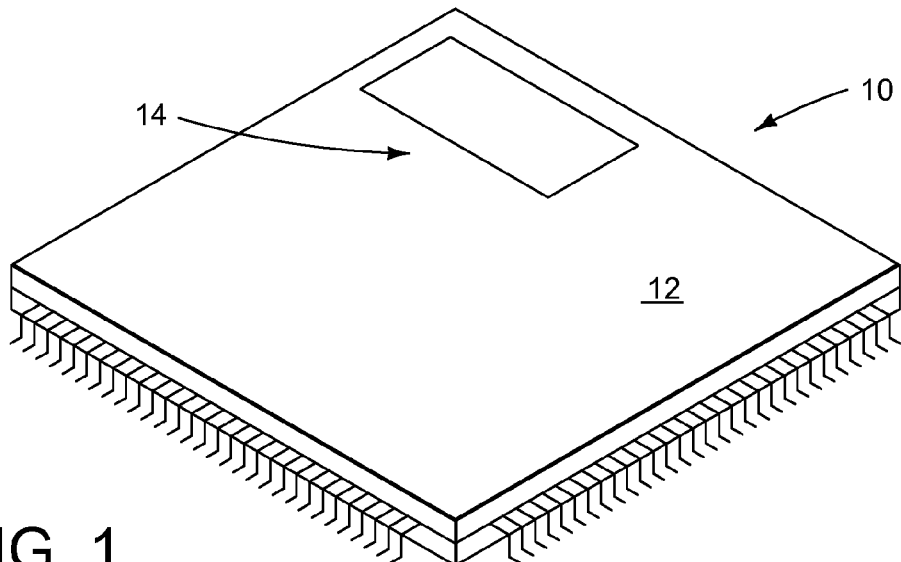
FIG. 1 shows an integrated circuit having a textured package according to one embodiment of the present invention.

Referring to FIG. 1, an integrated circuit 10 includes an exterior housing, or package 12. The housing can be formed in numerous ways. One is by injection molding. Another is by known ceramic-shaping techniques. At some point prior to shipment, the surface micro-topology of an area 14 on the housing is shaped in a seemingly random manner. (The area 14 can span the entire housing, if desired.) In the preferred embodiments, the patterning is substantially uniform across its extent, and may look like pebbling, mottling, graininess, or roughness. Yet this seemingly random surface conveys plural-bit digital information.

In an illustrative production cycle, a semiconductor wafer is processed to form several integrated circuits. Testing is conducted to determine the speed rating (or other grade) of each circuit. (The testing can be done while all the circuits are still on the wafer, or after the wafer has been diced into dies, or after the dies have been packaged in a housing.) The housing is shaped with a texture that reflects the test results, and/or other circuit characteristics.

The circuits then enter the stream of commerce and eventually end up at a computer manufacturer. On receipt, the manufacturer checks the circuits' grade using a simple hand-scanner. The scanner reflects light from the textured surfaces of the integrated circuit packages, producing data that is fed to a microprocessor-based terminal. The terminal decodes the data and extracts the encoded information (optionally referring to a look-up-table or database to expand coded values into textual descriptions). The terminal presents a display of the decoded information (e.g. speed rating, date and place of manufacture, etc.), and logs same into an inventory control database. If the decoded speed rating is different than that marked on the package, the manufacturer can return the circuit to the distributor as being non-conforming.

In an exemplary embodiment, the encoded information is 32 bits, and is broken down into fields as follows:

| Bits 1-5 | Processor speed: | 0—unspecified |
| | | 1—100 MHz |
| | | 2—125 MHz |
| | | 3—133 MHz |
| | | 4—150 MHz |
| | | 5—166 MHz |
| | | 6—175 MHz |
| | | 7—200 MHz |
| | | 8—225 MHz |
| | | 9—233 MHz |
| | | 10—250 MHz |
| | | 11—266 MHz |
| | | 12—275 MHz |
| | | 13—300 MHz |
| | | 14—325 MHz |
| | | 15—333 MHz |
| | | 16—350 MHz |
| | | 17—366 MHz |
| | | 18—375 MHz |
| | | 19—400 MHz |
| | | 20 through 31—[reserved] |
| Bits 6-20 | Manufacture date, coded as day numbers, with 0 = January 1, 1998 | |
| Bits 21-23 | Cache | 0—no cache |
| | | 1—128 cache |
| | | 2—256K cache |
| | | 3—512K cache |
| | | 4—1024K cache |
| | | 5 through 7 [reserved] |
| Bits 24-28 | Fab identification | 0—Fab line #1 |
| | | 1—Fab line #2 |
| | | . . . etc . . . |
| Bits 29-32 | Processor Family | 0—Pentium |
| | | 1—Pentium with MMX |
| | | 2—Pentium II |
| | | 3—Mobile Pentium |
| | | 4—Pentium II Xeon |
| | | 5—Celeron |
| | | 6 through 15—[reserved] |

Considering the encoding process in more detail, there are many techniques for representing plural bits of binary data in noise-like patterns. Many rely on spread-spectrum techniques. In one technique (FIG. 2), the binary data is represented as a sequence of "−1"s and "1"s, instead of "0"s and "1"s. The binary data payload can comprise a single datum, but more typically comprises several. For expository convenience, the data payload in the exemplary embodiment comprises 4 bits. More or less bits, of course, can be used. (Error detecting/correcting bits can be included if desired.)

A pseudo-random grid pattern, also comprised of "−1"s and "1"s, is generated. (In the exemplary embodiment, the pseudo-random grid pattern is 7×7 cells, as shown in FIG. 2C.) To encode, the first element of the grid is multiplied by the first bit of the binary data payload. The second element of the grid is multiplied by the second bit of the binary data payload, and so forth. At the fifth element of the grid, the binary data payload has been exhausted, so it is recycled from the beginning. Thus the fifth element of the grid corresponds to the first bit of the payload, the second element of the grid corresponds to the second bit of the payload, etc. The results are shown at FIG. 2D. This process yields an output grid pattern of "−1"s and "1"s in which the binary data sequence has been encoded. (In other embodiments, the bits of the binary data payload need not be mapped to successive cells of the pseudo-random grid in row/column order. Instead, any known mapping of payload bits to grid cells can be employed.)

(It will be recognized that the binary data payload can be extracted from the output grid pattern by the inverse of the just-described operation. The values in the output grid pattern are divided by corresponding elements of the same pseudo-random grid pattern, yielding a repeated version of the binary data payload sequence.)

After the output grid pattern is determined, the pattern is used to texture the surface of the integrated circuit housing. If the housing is made by an injection molding process, the mold can be etched by a computer-driven etching apparatus. Each cell in the output grid pattern can correspond, e.g., to a 250×250 micron patch on the mold. If the output grid pattern in a particular cell has a value of "1," a depression can be formed in a corresponding patch on the mold surface. If the output grid pattern in a particular cell has a value of "−1," no depression is formed. (The depth of the depressions can depend on aesthetic considerations. Typical depressions have a depth less than a half millimeter, and may be on the order of the patch size (250 microns) or less.)

The resulting pattern of mold-pitting is a physical manifestation of the output grid pattern. When the mold is used to form an integrated circuit housing, the negative of this pattern will be created, with each pit resulting in a raised point on the housing.

The size of the textured region depends on the patch size, and the number of rows/columns in the output grid pattern. The larger the textured region, the more "signal" is available for decoding, and the less exacting can be the specifications of the reading device. A textured region about one centimeter on a side has been found to provide more than adequate signal. Smaller textured regions (or larger) can be used, depending on the application requirements.

Techniques other than computer-controlled etching apparatuses can be used to shape the mold in accordance with the output grid signal. A small computer-controlled milling machine can be used. So can laser cutting devices.

While the foregoing approach contemplates that the housing is formed with the texture already on it, in other embodiments the housing can be formed with a flat surface, and the texturing applied later, as by a heated press mold (assuming the packaging material is thermoplastic).

To enhance the "signal" conveyed by the texturing, surface changes can be made corresponding to both "1" and "−1" values in the output pattern grid (instead of just corresponding to the "1" values, as described above). Thus, raised areas are formed in patches corresponding to "1" valued output pattern cells, and pits are formed corresponding to "−1" valued output pattern cells.

In other embodiments, the texturing can also be applied by an additional layer of material applied to the housing in the desired output pattern after the housing has been formed. For example, a viscous ink can be applied in a screen printing process. The screen has an opening where the corresponding cell of the output grid pattern has a "1" value, and no opening otherwise. When the viscous ink is applied through the screen, small patches of ink are deposited where the screen had openings, but not elsewhere. (Patches larger than 250 microns may be employed in such embodiments, depending on the resolution limitations of the screen printing process.) The result is again a textured surface, with the pattern of raised areas conveying the binary data payload.

Various material other than ink can be applied to form the textured layer on top of the housing. Thermoplastics and epoxy resins are just two alternatives.

In some such embodiments, techniques other than printing are used to apply a textured layer to the housing. For example, various photolithographic techniques can be used. One technique employs a photo-reactive polymer, which is applied to the surface and then optically exposed through a mask corresponding to the output grid pattern. The exposed polymer is developed, thereby removing patches of material.

In still other embodiments, the output grid pattern is printed onto the housing surface in two contrasting colors (e.g. black and white). Cells having a "1" value can be printed in one color, and cells having a "−1" value can be printed in another. In such embodiments, the binary payload is not discerned from a pattern of textures, but rather from a pattern of contrasting colors.

In a variant of the foregoing embodiment, a single color of ink is employed; the color of the housing provides the contrast.

Numerous other micro-shaping and -texturing technologies can similarly be employed, as will be familiar to artisans in that field.

The earlier-described algorithm for generating the output grid pattern is exemplary, but a great many other encoding algorithms can be used. One employs N different frames of pseudo-random values ("−1" and "1"), where N is the number of bits in the binary payload. The frame can have any size. An exemplary frame is an array of 128×128 cells. (Each cell again is 250 microns on a side, resulting in a frame size of about 0.8 cm×0.8 cm.) A composite frame is formed by summing selected ones of these frames, depending on the data payload. For example, if the data payload is "1010," then the first and third frames are summed (corresponding to the "1"s in the first and third bit positions). The second and fourth frames can be left un-used, or can be subtracted from the just-formed sum for better signal-to-noise ratio. The resulting output grid pattern is implemented as a texture or printed pattern on the housing, as above.

To extract the binary data payload from such a composite frame, correlation operations are performed between the composite frame and each of the component N frames. Those component frames that exhibit a high correlation correspond to bit positions having a value of "1" in the binary data payload.

Another class of encoding algorithms employs the binary data payload as coefficients representing a pattern transformed to another domain. For example, if the binary data payload consists of 16 bits, these bits can serve as 16 DCT coefficients, thereby uniquely defining a 4×4 patch of "1" and "−1" cells. This patch can be replicated as necessary to span the desired area on the housing. (The mapping between the DCT and un-transformed domain yields the seeming randomization of the resulting pattern; no pseudo-random component is expressly introduced.)

To decode, the patch is transformed to the DCT domain, and the DCT coefficients provide the binary data payload.

In this and the foregoing embodiments, it is commonly desirable to provide some synchronization or calibration signal, so that the beginning of the binary data payload can be uniquely identified, and so as to enable rotation-insensitive detection. Various such signals and related techniques are disclosed in the assignee's earlier-cited applications and patents.

In addition to the encoding techniques particularly detailed above, essentially any "digital watermarking," "steganography," or "data hiding" technique known in the literature can alternatively be used. While such techniques typically embed data into imagery, the same techniques can likewise be applied to a "null" image to yield just a data embedding signal. (In systems that adaptively scale the watermark energy to image contents, the scaling function should be omitted since the "image contents" here are null.)

The References Cited section of this patent detail many such alternative marking techniques. A search of the US Patent Office's web-based search system, using keywords such as "watermark*" and "steganogr*" will reveal others. The artisan is assumed to be familiar with the range of available watermarking/data hiding/steganography art.

Figure 3:
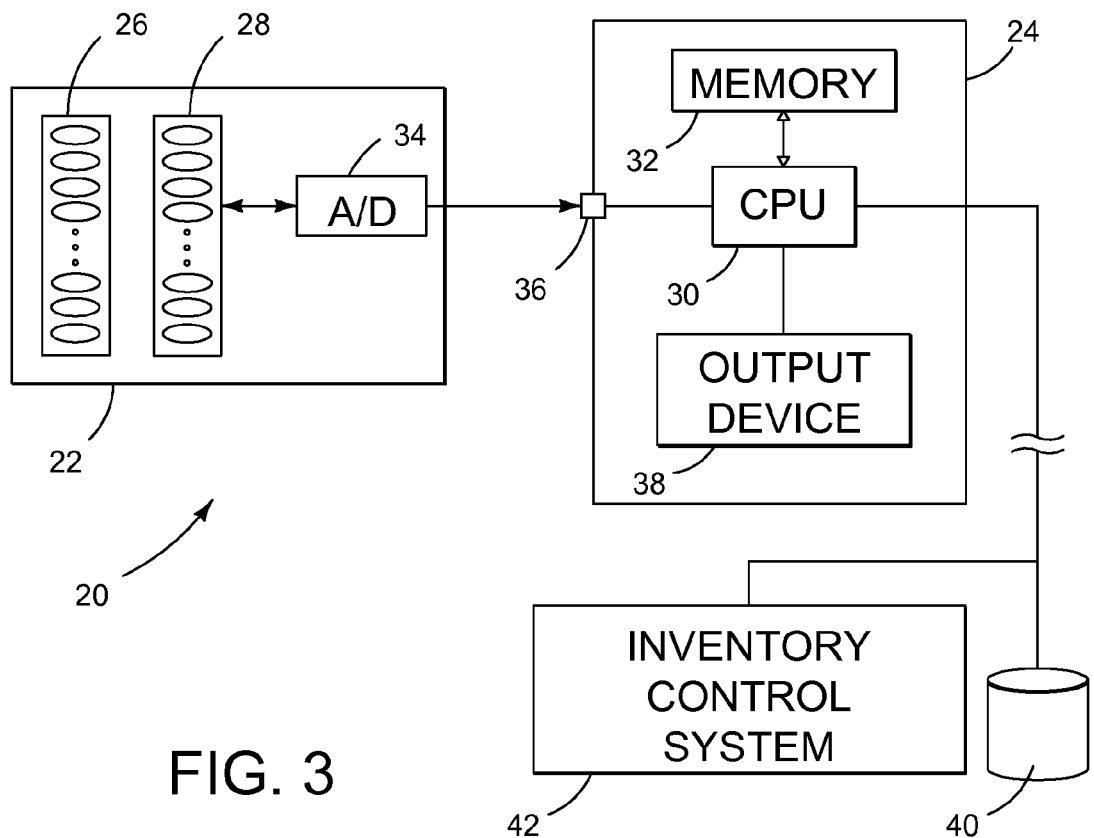
FIG. 3 is a diagram showing an apparatus used to decode textured product markings according to one embodiment of the invention.

A detector system 20 suitable for use with the foregoing embodiments is shown in FIG. 3 and includes a hand-scanner 22 and a computer 24.

The hand scanner is conventional and includes a linear light source 26 (e.g. an array of LEDs with associated lensing), a corresponding array of light detectors 28 (e.g. photodiodes), and A/D circuitry 34. The computer includes a microprocessor 30, a memory 32, an I/O port 36, and an output device 38.

The light source 26 illuminates a swath of the textured region, and the array of light detectors 28 generates analog signals related to the reflected light. These analog signals are periodically sampled and converted into digital form by the A/D converters 34, and the resultant digital data is provided to the I/O port 36.

Stored in memory 32 of the computer are software instructions causing the microprocessor 30 to perform a decoding operation on the digital data provided to the I/O port 38. In exemplary arrangements, the sampled digital data is arrayed in the memory 30 and analyzed in accordance with a decoding algorithm. (The decoding algorithm is tailored to correspond to the encoding technique by which the texture was formed.) The decoding operation outputs the originally-encoded binary data payload.

The binary data payload can be directly presented for viewing, but is preferably first "interpreted." To interpret the payload, the component fields are matched with corresponding textual descriptions (such as those presented above) using a look-up-table stored in memory 30, or using an associated (local or remote) database 40. The resulting textual descriptions are then output to the operator, using either a screen display, an audio annunciator, etc. The decoded data is also desirably entered into an inventory control system 42, noting the date, time, and location of scanning.

The foregoing discussion focused on marking of integrated circuit packaging, and use of such marking to prevent mislabeling of products. However, the disclosed techniques are likewise applicable to any other article whose surface can be textured, and to applications where true counterfeiting (rather than mis-labeling) is at issue.

Counterfeiting of commercial goods is a longstanding problem, as evidenced by sidewalk vendors of "Rolex" watches. Surfaces of watches, and other articles, can be inconspicuously textured to encode authentication data. At ports of entry, U.S. Customs officials can use hand-held scanners to confirm that the texturing encodes the expected data. To guard against artful reproduction of texture markings found on authentic goods, the encoded data can include a date beyond which importation should not be permitted. Customs officials encountering articles with expired dates can seize the goods pending an investigation. (Such encoding of expiration date data in hidden embedded data finds other applications as well.)

Texturing can also be applied to automotive components, to identify or authenticate same. For example, on new cars, vehicle identification numbers (presently printed on a dashboard plate, and on various components) can be encoded in texture form and inconspicuously applied throughout the vehicle, including etched onto glass surfaces in small patches. (The provision of such information in machine-readable form on the exterior of the vehicle enables various downstream scanned data-based applications.)

As will be apparent from the foregoing, the concepts detailed above are not limited just to integrated circuits, but instead can be applied to essentially any article—each with its own set of attendant benefits.

To provide a comprehensive disclosure without unduly lengthening this specification, applicants incorporate by reference the disclosures of the above-cited patents and applications.

Having described and illustrated the principles of our invention with reference to various embodiments thereof, it will be recognized that the invention can be modified in arrangement and detail without departing from its basic principles.

For example, while the above-described embodiments applied the texture marking to the article itself, some applications may be better served by so-marking a container in which the article is distributed. This can be advantageous, for example, when the item is textured in aid of an inventory control system—the item can be accurately identified for inventory without opening the container.

In view of the many possible embodiments to which the principles of our technology may be put, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. A method comprising:
   determining an operating or performance characteristic associated with electronic circuitry;
   determining information associated with the operating or performance characteristic;
   utilizing a programmed electronic processor, hiding the information on or in a surface associated with the electronic circuitry so that the presence of the information is not readily apparent to a human observer of the surface, but the information can be obtained from the surface with visible light imaging, wherein the information is useable in determining whether the electronic circuitry is operating or functioning as expected.

2. A programmed computing device comprising instructions stored in memory, the instructions, if executed by a computing device, cause the computing device to perform operations comprising:

determining an operating or performance characteristic associated with electronic circuitry;

determining information associated with the operating or performance characteristic;

utilizing a programmed electronic processor, hiding the information on or in a surface associated with the electronic circuitry so that the presence of the information is not readily apparent to a human observer of the surface, but the information can be obtained from the surface with visible light imaging, wherein the information is useable in determining whether the electronic circuitry is operating or functioning as expected.

3. A non-transitory computer readable medium comprising instructions stored therein, if executed by a computing device, cause the computing device to perform operations comprising:

determining an operating or performance characteristic associated with electronic circuitry;

determining information associated with the operating or performance characteristic;

utilizing a programmed electronic processor, hiding the information on or in a surface associated with the electronic circuitry so that the presence of the information is not readily apparent to a human observer of the surface, but the information can be obtained from the surface with visible light imaging, wherein the information is useable in determining whether the electronic circuitry is operating or functioning as expected.

4. An object comprising:

electronic processing circuitry having an operating or performance metric associated therewith; and steganographic indicia carried by the object, wherein the steganographic indicia is usable as an index to verify the operating or performance metric.

5. The object according to claim 4 wherein the electronic processing circuitry is in a state of operation.

6. An apparatus comprising:

electronic memory; and machine-readable indicia usable as a registry index including data that provides an indication regarding an expected capacity of the electronic memory.

* * * * *

UNITED STATES PATENT AND TRADEMARK OFFICE
CERTIFICATE OF CORRECTION

| | | |
|---|---|---|
| PATENT NO. | : 8,000,518 B2 | Page 1 of 1 |
| APPLICATION NO. | : 12/485666 | |
| DATED | : August 16, 2011 | |
| INVENTOR(S) | : Davis et al. | |

It is certified that error appears in the above-identified patent and that said Letters Patent is hereby corrected as shown below:

Title page, item (56), under "Other Publications", in Column 2, Line 2, delete "Summay;" and insert -- Summary; --.

Page 3, item (56), under "Other Publications", in Column 2, Line 2, delete "2009" and insert -- 2008 --.

Signed and Sealed this
Seventh Day of February, 2012

David J. Kappos
*Director of the United States Patent and Trademark Office*